United States Patent [19]
Burkhardt et al.

[11] B 3,989,223
[45] Nov. 2, 1976

[54] ROTARY MOTION FAILSAFE GATE VALVE ACTUATOR

[75] Inventors: Joseph A. Burkhardt, New Orleans; Thomas W. Childers, Mandeville, both of La.; Roger J. Koerner, Fountain Valley, Calif.

[73] Assignee: Exxon Production Research Company, Houston, Tex.

[22] Filed: Dec. 28, 1973

[21] Appl. No.: 429,434

[44] Published under the second Trial Voluntary Protest Program on February 17, 1976 as document No. B 429,434.

[52] U.S. Cl. .................. 251/58; 74/89.15; 74/424.8 VA; 92/2; 92/33; 92/113; 92/116
[51] Int. Cl.² ................................ F16K 31/12
[58] Field of Search ............... 251/63.4, 14, 58, 69, 251/266; 74/89.15, 424.8 R, 424.8 VA; 92/114, 116, 31, 33, 2, 113

[56] References Cited
UNITED STATES PATENTS

| | | | |
|---|---|---|---|
| 2,709,062 | 5/1955 | Lamb | 251/14 |
| 2,883,144 | 4/1959 | Kendig | 92/33 |
| 3,450,382 | 6/1969 | Calim | 92/31 |
| 3,512,421 | 5/1970 | Anderson | 74/89.15 |
| 3,628,397 | 12/1971 | Sheesley | 74/424.8 VA |
| 3,640,140 | 2/1972 | Gulick | 74/89.15 |

*Primary Examiner*—Martin P. Schwadron
*Assistant Examiner*—George L. Walton
*Attorney, Agent, or Firm*—John S. Schneider

[57] ABSTRACT

An hydraulically operated failsafe valve actuator for use on non-rising valve stems, particularly in a subsea environment. A rotatable shaft is connected to the non-rising valve stem. In one embodiment the valve is actuated to open by a fluid pressure operated motor acting against the bias of a spring. Means connects means linearly movable along the shaft and converts the linear movement of the linear movable means to rotary movement of the shaft. Spring means moves the linearly movable means in one direction to cause the shaft to rotate in one direction. Fluid pressure means, including a fluid pressure operated motor, rotates the shaft in an opposite direction to cause the linearly movable means to move in an opposite direction along the shaft. In another embodiment the valve is actuated to open by a fluid pressure operated piston acting against the bias of the spring. The piston is mounted on the rotatable shaft and moves linearly along the shaft to cause the shaft to rotate. Spring means moves the piston in one linear direction to rotate the shaft in one direction. Fluid pressure moves the piston in an opposite direction to rotate the shaft in an opposite direction.

19 Claims, 10 Drawing Figures

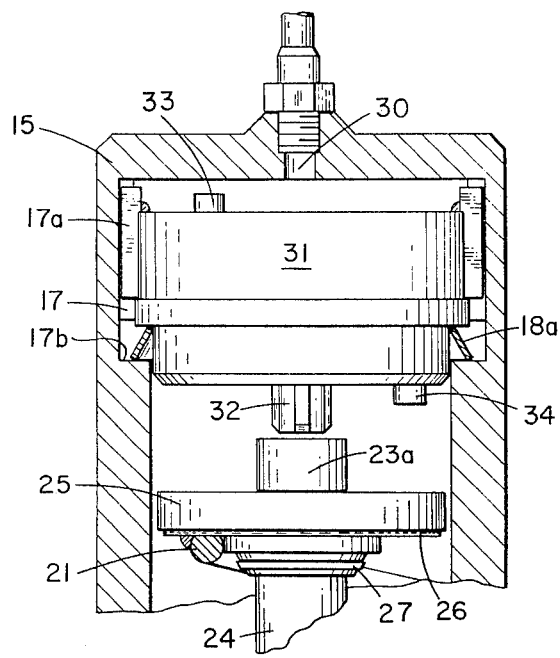
FIG. 3.
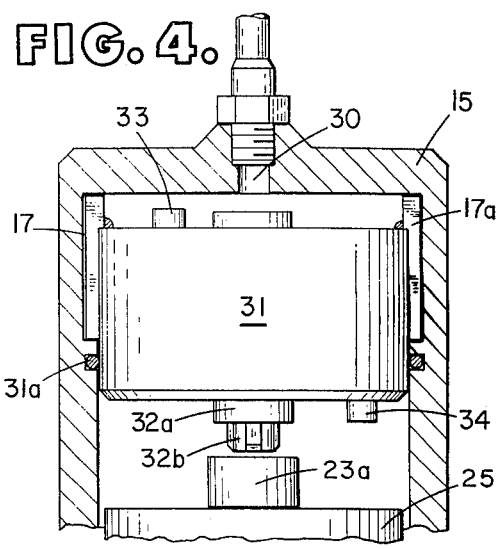
FIG. 4.
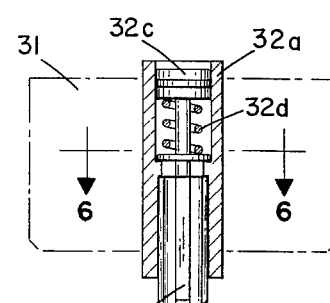
FIG. 5.
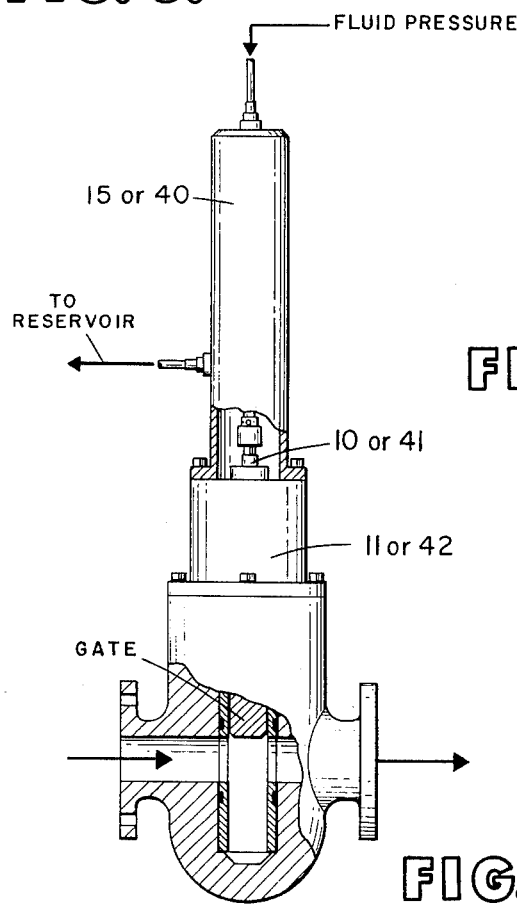
FIG. 10.
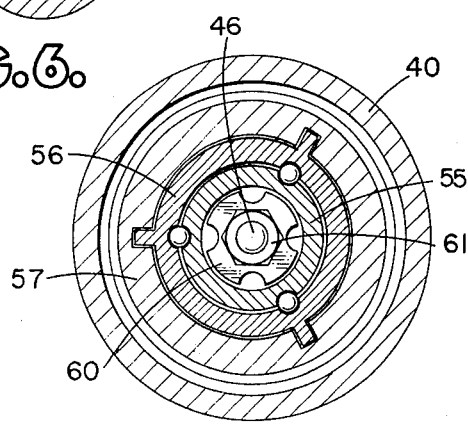
FIG. 6.
FIG. 9.

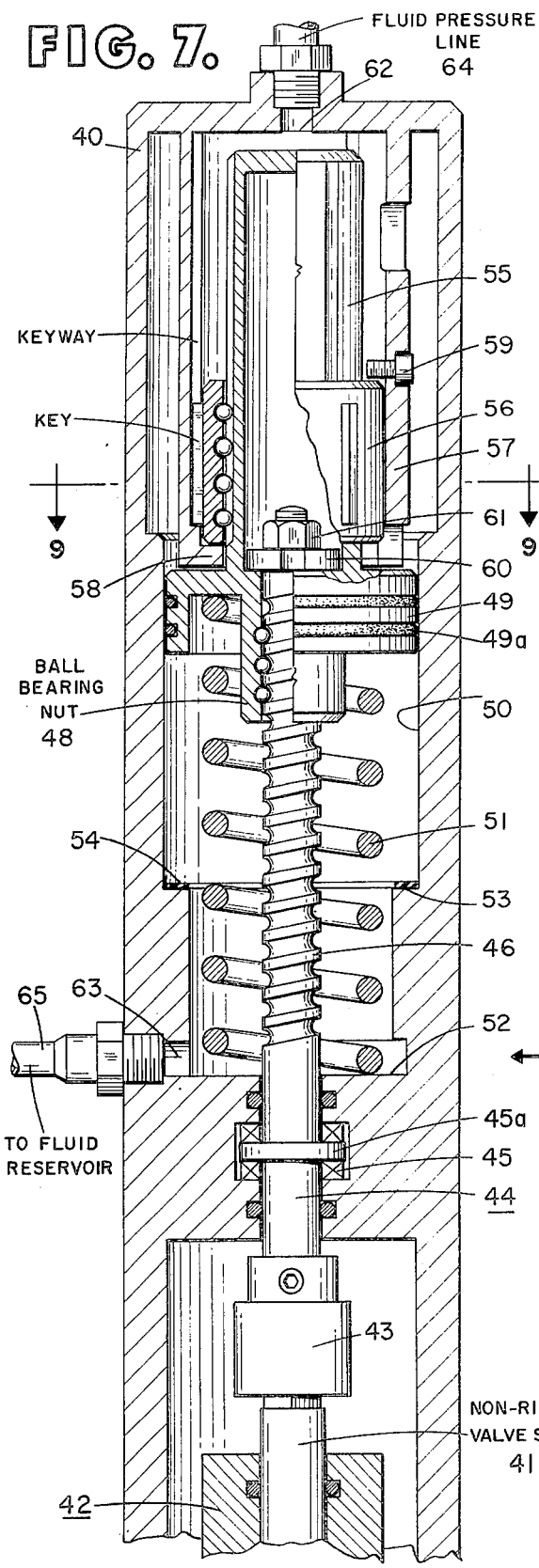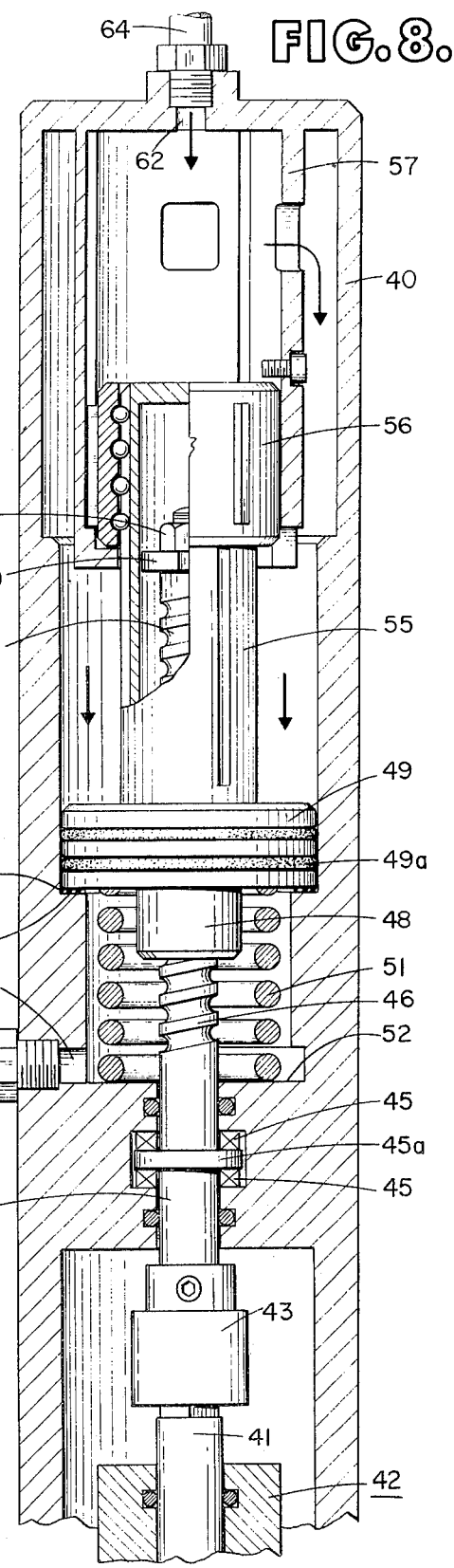

ROTARY MOTION FAILSAFE GATE VALVE ACTUATOR

BACKGROUND OF THE INVENTION

The present invention concerns a hydraulically powered, failsafe spring-returned actuator for a nonrising stem valve which retains the desirable features of a linear valve operator and non-rising stem valve and overcomes the problem of previously available actuators.

Hydraulically actuated failsafe valves presently available to industry utilize a spring return piston directly connected to the valve gate. Fluid pressure applied to the piston overcomes the forces of the spring, valve body pressure acting on the area of the stem, and the frictional forces of the gate drag, to open the valve. This type of actuator has one principal advantage in that the valve body pressure acts on the stem area to close the valve and then to hold the valve closed, thus making the valve failsafe. However, in deep water well operations where ambient fluid pressure may be above expected well fluid producing pressures, fluid pressure on the stem area will reverse and tend to open the valve. Since it is conceivable that valve body fluid pressure may be below ambient pressure when the well is producing and above ambient pressure when the well is shut-in the valve body pressure effects become difficult to handle. Such a direct acting hydraulically operated valve has another potentially serious problem in that it is essentially a rising stem valve. Non-rising stem valve design has been accepted by industry as superior to the rising stem valve principally because the stem seal is a rotating seal and does not drag the stem in and out of the stem seal. Effects of surface deterioration due to corrosive well fluids or abrasive action of debris on the stem is minimized by the non-rising stem valve. Present hydraulically powered operators for subseas use are limited to either direct acting piston cylinders on rising stem valves or to hydraulic motors and gear trains on non-rising stem valves. Hydraulic motor powered operators require hydraulic power to close as well as open the valves and, consequently, do not return to a "safe position" when control power is lost.

SUMMARY OF THE INVENTION

A valve actuator for a failsafe valve having a non-rising stem comprising a rotatable shaft connected to the stem; linearly movable means; means connecting the rotatable shaft and the linearly movable means for converting linear movement of said linearly movable means to rotary movement of said shaft; biasing means for moving said linearly movable means in one linear direction and thereby rotating the shaft in one rotational direction; and fluid pressure means for moving said linearly movable means in a opposite linear direction and thereby rotating said shaft in an opposite rotational direction. In one embodiment of the invention the linearly movable means includes a shaft connected to a hydraulic motor and in another embodiment of the invention the linearly movable means includes a piston.

BRIEF DESCRIPTION OF THE DRAWINGS

FIG. 3 illustrates a modification of the valve actuator of FIGS. 1 and 2;

FIG. 4 illustrates a modification of the motor mounting and clutch assembly of FIGS. 1 and 2;

FIG. 5 is a view of the piston within the motor of FIG. 4;

FIG. 6 is a view taken on lines 6—6 of FIG. 5;

FIGS. 7 and 8 illustrate the components of a modification of the valve actuator;

FIG. 9 is a view taken on lines 9—9 of FIG. 7; and

FIG. 10 illustrates the valve actuator of the invention mounted on a conventional gate valve.

DETAILED DESCRIPTION OF THE INVENTION

Figures 1, 2:
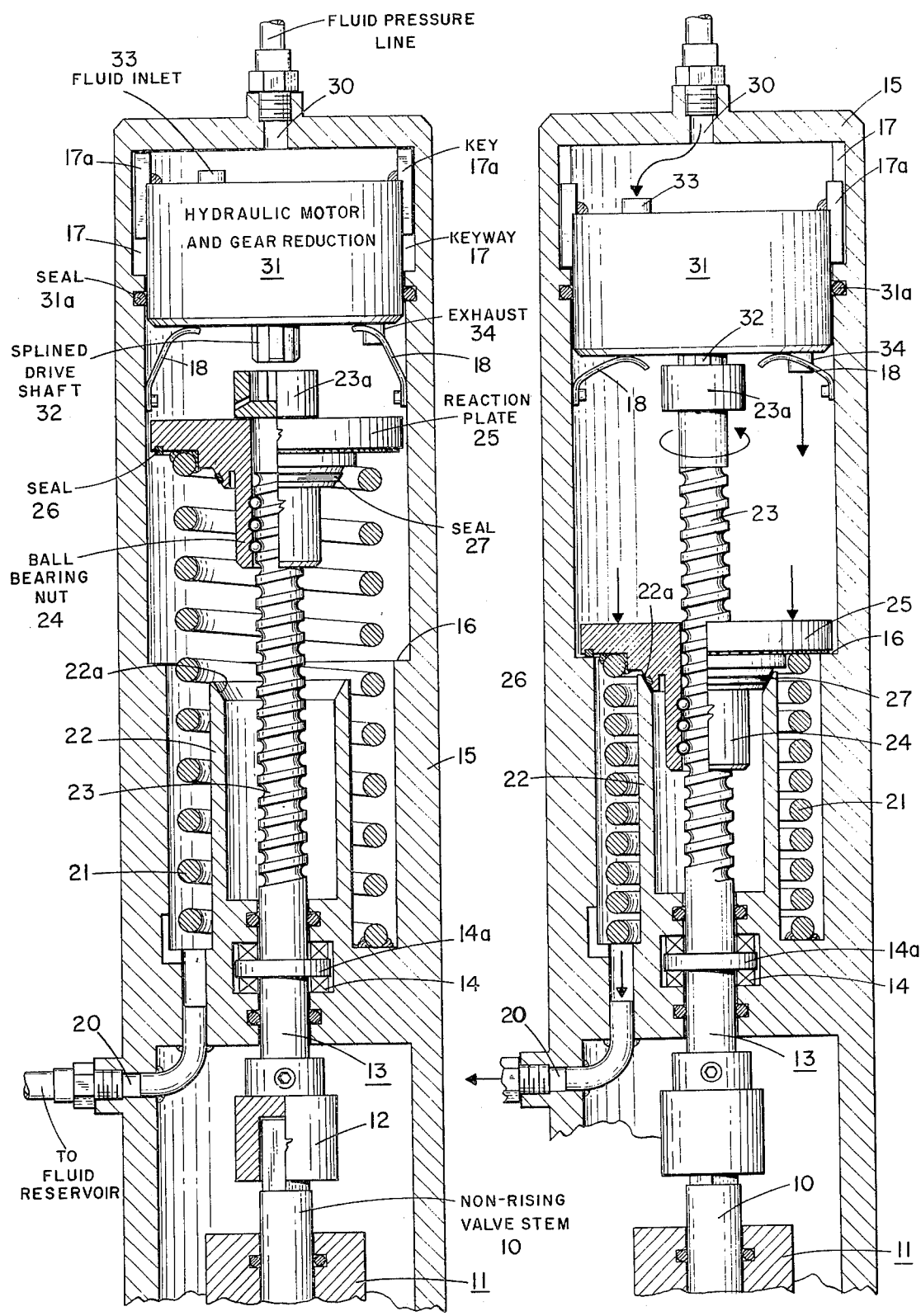
FIGS. 1 and 2 illustrate the components of the valve actuator for one embodiment of the invention.

Referring to FIGS. 1 and 2 there is shown a nonrising gate valve stem 10 connected to gate valve 11. An adaptor 12 to gate valve stem 10 is connected to a shaft 13 which is provided with thrust bearings 14 positioned above each side of annular shoulder 14a of shaft 13 to carry the compression loads of the shaft. Shaft 13 and thrust bearings 14 are located in a valve actuator housing 15 which is formed with a lower inner ledge or shoulder 16 and keyways 17 in the upper end thereof. Fixed to the inner wall of housing 15, below keyways 17, are a plurality of inwardly extending leaf spring fingers 18. A fluid outlet 20 connects into the interior of housing 15 in which is also contained a spring 21, an inner barrel 22, a screw shaft portion 23, formed on the upper end of shaft 13, and a ball bearing nut 24 mounted on screw shaft 23. The upper end of nut 24 defines a circular reaction plate 25 on which is arranged a seal 26 for engagement with ledge 16 and another seal 27 for engagement with the upper end 22a of inner barrel 22. A power fluid inlet 30 to housing 15 supplies power fluid to a hydraulic motor 31 having a gear reduction mechanism and a splined output shaft 32 which is adapted to engage splined collar end 23a of actuator shaft 23. Keys 17a, fixed to motor 31 and engaging keyways 17, allow vertical movement of the motor but prevent rotational movement thereof. As shown in FIG. 1 motor 31 is biased to its upper position by leaf springs 18 and in this position splined shaft 32 is disengaged from the splined collar end 23a of threaded shaft 23. A seal ring 31a in housing 15 sealingly engages the lower periphery of the motor. Motor 31 has a fluid inlet port 33 and a fluid exhaust port 34. Fluid outlet 20 connects to a reservoir (not shown) which is maintained at ambient pressure.

In operation, (FIGS. 1 and 2), to open valve 11 fluid pressure applied through inlet 30 moves motor 31 downwardly against the bias of springs 18 causing splined shaft 32 to engage within splined collar end 23a. Fluid pressure applied through inlet 33 of motor 31 rotates threaded shaft 23 in nut 24 causing reaction plate 25 to move downwardly toward shoulder 16 to cause valve 11 to begin to open. Motor exhaust fluid from exhaust 34 flows through outlet 20. When reaction plate 25 engages lower shoulder 16 static seals 26 and 27 seal on shoulder 16 and barrel end 22a, respectively, and shut off flow of exhaust fluid to outlet 20. Pressure above and below motor 31 is thereby equalized, allowing the motor to be moved upwardly by the bias of spring 18 and disengaging the splined shaft 32 from the splined collar end 23a of shaft 23. Fluid pressure acting on the area of the spring reaction plate 25 between seals 26 and 27 holds plate 25 in the down position. When fluid pressure is released from above spring reaction plate 25 spring 21 drives plate 25 and nut 24 upwardly towards motor 31 thereby rotating shaft 23 to close the valve. Reaction plate 25 is mechanically attached to spring 21 to prevent rotation of plate 25.

As shown in FIG. 3, motor 31 is mounted in housing 15 on a Bellville type conically shaped spring seal 18a, which engages annular shoulder 17b of housing 15 below keyways 17 and a shoulder 17c formed on motor 31. Spring 18a functions as a seal between motor 31 and housing 15 and as a means to automatically disengage splined shaft 32 from splined collar end 23a when pressure is equalized across motor 31. It performs the same functions as seal 31a and springs 18 of the embodiment of FIGS. 1 and 2.

FIGS. 4, 5 and 6 illustrate a motor 31 which is fixed in housing 15 against vertical and rotational movement (keyways 17 and keys 17a prevent such movement) and provided with a hollow drive shaft 32a in which is positioned a splined clutch engagement member 32b. Pressure above motor 31, acting on piston 32c, causes clutch member 32b to move downwardly, against the bias of spring 32d, to engage splined collar end 23a. Release of pressure on piston 32c permits spring 32d to disengage clutch member 32b.

Referring to FIGS. 7, 8 and 9 there is shown a housing 40 containing a non-rising valve stem 41 of a gate valve 42. Valve stem 41 is connected to a rotatable shaft 44 by an adapter 43. Thrust bearings 45 positioned above and below circular shoulder 45a of shaft 44 carry the compression loads of the shaft 44. The upper portion of the shaft forms a screw 46 which threads through a ball bearing nut 48. The upper end of nut 48 is fixed to a piston 49 which is slidably arranged in a cylinder portion 50 of housing 40. Piston 49 is provided with seal rings 49a. The upper end of screw 46 extends through piston 49. A compression spring 51, bearing at its lower end on a bottom closure plate 52 biases the piston 49 upwardly in cylinder 50. Adjacent the lower end of cylinder 50 is an annular ledge 53 which acts as a stop for piston 50 and also supports a back-up seal ring 54, which acts as a static seal when engaged by piston 49.

Fixed to the upper end of piston 49 and coaxially aligned with screw 46, is an upwardly extending splined sleeve 55 which is closed on its upper end. Sleeve 55 provides a fluid tight chamber in housing 40 above piston 49 and also provides a bore to contain the upper end of screw 46 when piston 49 and nut 48 is moved by fluid pressure downwardly in cylinder 50. Sleeve 55 extends through and is spline-connected to a ball bearing-splined collar 56 positioned in the annulus between sleeve 55 and a cylindrical member 57. The outer wall of collar 56 is keyed, as shown, to the inner wall of cylindrical member 57 to prevent rotational movement of collar 56 which is limited in its upward movement by a shoulder 58 of collar 56 and a bolt 59 extending through cylindrical member 57. A slotted bushing 60 is attached to the top of screw 46 by a nut 61. The slotted bushing allows fluid flow through the slots during downward movement of the piston 49 and sleeve 55, and also acts as a support for the upper end of the screw 46. Housing 40 is provided with a pressure inlet port 62 above piston 49 and a fluid outlet port 63 below ledge 53. Inlet port 62 connects by a conduit 64 to a source of fluid pressure such as a hydraulic pump (not shown) and outlet 63 is connected by conduit 65 to a fluid reservoir (not shown) which is maintained at ambient pressure.

In operation, power fluid through conduit 64 acts on piston 49 to move it downward. Low friction ball bearing nut 48 and screw shaft 46 convert linear piston motion into rotary motion. Hydraulic pressure acts against the top of the piston to drive the piston downward against the bias of spring 51 and resistance of the nut screw 48, 46 until the piston is stopped on the static seal ledge 53, 54 of cylinder 50 in which position of piston 49 gate valve 42 is fully open. As piston 49 moves, screw shaft 46 turns through as many turns as is determined by the piston travel divided by the screw lead. The splined connection between the exterior of the sleeve 55 and wall 57 absorbs the rotational reaction of the piston. When fluid pressure is released from above piston 49 spring 51 forces piston 49 upwardly thereby rotating shaft 46 and shaft 41 connected thereto to close gate valve 42.

FIG. 10 illustrates the attachment of either of the actuator housings 15 or 40 to a conventional gate valve. When the housing is pressurized the gate valve is held in its open position as shown. When pressure fails, or is intentionally released, the valve is automatically closed by spring pressure as has been described herein.

Although the valve actuator illustrated in the specific embodiments of the invention shown and/or described herein is arranged in a vertical position in which the spring biasing means moves the valve upwardly to closed position, the invention encompasses other valve actuator positions to accommodate other valve arrangements.

Other changes and modifications may be made in the embodiments of the invention shown and/or described herein without departing from the scope of the invention as defined in the appended claims.

Having fully described the objects, apparatus, advantages and nature of our invention, we claim:

1. A valve actuator for a valve comprising:
   a housing having a fluid pressure inlet, a fluid pressure exhaust, and an inner sealing shoulder;
   a rotatable screw shaft arranged in said housing connectable at one end to said valve;
   a ball bearing nut mounted on the other end of said shaft and forming a piston longitudinally movable in said housing from a first to a second position;
   biasing means surrounding said screw shaft engaging said piston and urging said piston to said first position thereof; said piston containing peripheral seals for sealing engagement with the inner wall of said housing; said piston sealingly engaging said inner sealing shoulder of said housing when said piston is in said second position thereof; and
   means connected to said piston engaging said housing to prevent rotation of said piston.

2. A valve actuator as recited in claim 1 including an adapter connecting said screw shaft to said valve; and seal means surrounding said screw shaft.

3. A valve actuator as recited in claim 2 wherein said means for preventing rotation of said piston includes a keyway formed in said housing and a key mounted on said piston for engaging said keyway.

4. A valve actuator for a valve comprising:
   a housing having a fluid pressure inlet and a fluid pressure exhaust;
   a hydraulic motor arranged in said housing between said fluid pressure inlet and said fluid pressure exhaust and including a rotatable splined drive shaft;
   a rotatable screw shaft arranged in said housing connectable at one end to said valve;

a ball bearing nut mounted on the other end of said screw shaft and forming plate means;

connection means mounted on the other end of said screw shaft engageable with said motor drive shaft to rotate said screw shaft upon rotation of said motor shaft; said plate means being movable along said screw shaft from a first to a second position upon rotation of said screw shaft in one direction;

biasing means engaging said plate means and urging said plate means to said first position thereof;

means for sealingly engaging said plate means when said plate means is in said second position thereof to prevent flow of fluid to said fluid exhaust;

said drive shaft engaging said connector means upon application of fluid pressure to said hydraulic motor; and means for disengaging said drive shaft from said connection means upon release of fluid pressure from said hydraulic motor.

5. A valve actuator as recited in claim 4 including:
said hydraulic motor being immovable and containing a cylinder;
a piston arranged in said cylinder and connected to said drive shaft and capable of moving said drive shaft upon application of fluid pressure to said piston from a disengaged to an engaged position with said connection means, and means for biasing said piston to urge said drive shaft from the engaged to the disengaged position thereof with said connection means.

6. A valve actuator as recited in claim 4 including:
said hydraulic motor being movable from a first position in which said drive shaft and said connection means are disengaged to a second position in which said drive shaft and said connection means are engaged and vice versa, fluid pressure applied to said hydraulic motor moving said hydraulic motor from said first to said second position thereof; and
said means for disengaging said drive shaft from said connection means comprising biasing means.

7. A valve actuator as recited in claim 6 wherein said biasing means comprises a spring means.

8. A valve actuator as recited in claim 6 wherein said means for biasing said hydraulic motor comprises a conically shaped spring seal for sealing off the space between said hydraulic motor and the inner wall of said housing and for biasing said hydraulic motor to said first position thereof.

9. A valve actuator as recited in claim 6 including means for sealing off the space between said hydraulic motor and the inner wall of said housing.

10. A valve actuator as recited in comprises spaced-apart 7 wherein said spring means comprisesspaced-apart spring fingers; and including means for sealing off the space between said hydraulic motor and the inner wall of said housing.

11. A valve actuator for a failsafe valve comprising:
a housing having a fluid pressure inlet and a fluid pressure exhaust;
motor means arranged in said housing;
a rotatable splined drive shaft connected to and rotated by said motor means;
a rotatable screw shaft arranged in said housing and connectable to said valve;
a plate means connected to and movable along said screw shaft upon rotation of said screw shaft;
connection means mounted on said screw shaft and engageable with said drive shaft to rotate said screw shaft upon rotation of said drive shaft; said plate means being movable along said screw shaft from a first to a second position upon rotation of said screw shaft in one direction;

biasing means engaging said plate means and urging said plate means to said first position thereof;

means in said housing and means on said plate means cooperating to seal off said fluid pressure exhaust to prevent flow of fluid therefrom when said plate means is in said second position thereof;

said drive shaft engaging said connector means upon application of fluid pressure to said motor means; and means for disengaging said drive shaft from said connection means upon release of fluid pressure from said hydraulic motor.

12. A valve actuator for a valve comprising:
a housing having a fluid pressure inlet, a fluid pressure exhaust, an inner shoulder, and an inner bowl;
a hydraulic motor arranged in said housing between said fluid pressure inlet and said fluid pressure exhaust and including a rotatable splined drive shaft;
a rotatable screw shaft arranged in said housing connectable at one end to said valve;
a ball bearing nut mounted on the other end of said screw shaft and forming plate means;
a splined collar mounted on the other end of said screw shaft and engagable with said splined drive shaft;
said plate means being longitudinally movable along said screw shaft from a first to a second position upon rotation of said screw shaft in one direction;
biasing means surrounding said screw shaft and said bowl and engaging said plate means and urging said plate means to said first position thereof; said plate means sealingly engaging said inner shoulder and said inner bowl when said plate means is in said scond position thereof;
said splined drive shaft engaging said splined collar upon application of fluid pressure to said hydraulic motor; and
means for disengaging said splined drive shaft from said splined collar upon release of fluid pressure from said hydraulic motor.

13. A valve actuator as recited in claim 12 including an adapter connected to said screw shaft and said valve; and seal means surrounding said one end of said screw shaft.

14. A valve actuator as recited in claim 12 including:
said hydraulic motor being movable from a first position in which said drive shaft and said collar are disengaged to a second position in which said drive shaft and collar are engaged and vice versa; fluid pressure applied to said hydraulic motor moving said hydraulic motor from said first to said second position thereof; and
said means for disengaging said splined drive shaft from said splined collar comprising biasing means.

15. A valve actuator as recited in claim 12 including:
said hydraulic motor being immovable and containing a cylinder, a piston arranged in said cylinder and connected to said drive shaft and capable of moving said drive shaft upon application of fluid pressure to said piston from a disengaged to an engaged position with said collar, and means for biasing said piston to urge said drive shaft from the engaged to the disengaged position thereof with said collar.

16. A valve actuator as recited in claim 14 wherein said biasing means for disengaging said splined drive shaft from said splined collar comprises spring means.

17. A valve actuator as recited in claim 14 wherein said means for disengaging said splined drive shaft from said splined collar comprises a conically shaped spring seal for sealing off the space between said hydraulic motor and the inner wall of said housing and for biasing said hydraulic motor to said first position thereof.

18. A valve actuator as recited in claim 14 including means for sealing off the space between said hydraulic motor and the inner wall of said housing.

19. A valve actuator as recited in claim 16 wherein said spring means comprises spaced apart spring fingers; and including means for sealing off the space between said hydraulic motor and the inner wall of said housing.

* * * * *